United States Patent
Duquette

(10) Patent No.: US 11,068,324 B1
(45) Date of Patent: Jul. 20, 2021

(54) ADVANCED NOTIFICATION SYSTEM

(71) Applicant: AppDirect, Inc., San Francisco, CA (US)

(72) Inventor: Francois Duquette, Montreal (CA)

(73) Assignee: AppDirect, Inc., San Francisco, CA (US)

( * ) Notice: Subject to any disclaimer, the term of this patent is extended or adjusted under 35 U.S.C. 154(b) by 0 days.

(21) Appl. No.: 16/730,385

(22) Filed: Dec. 30, 2019

(51) Int. Cl.
*G06F 9/54* (2006.01)
*G06Q 30/02* (2012.01)
*G06Q 10/06* (2012.01)
*G06F 9/451* (2018.01)

(52) U.S. Cl.
CPC ............ *G06F 9/542* (2013.01); *G06F 9/451* (2018.02); *G06Q 10/0637* (2013.01); *G06Q 30/0201* (2013.01)

(58) Field of Classification Search
CPC ...................................................... G06F 9/542
USPC ........................................................ 719/318
See application file for complete search history.

(56) References Cited

U.S. PATENT DOCUMENTS

| | | | | |
|---|---|---|---|---|
| 9,641,692 | B2 * | 5/2017 | Ros | H04W 4/90 |
| 9,680,786 | B2 * | 6/2017 | Bain | H04L 51/20 |
| 9,953,007 | B2 * | 4/2018 | Oyarzabal | G06F 40/186 |
| 10,715,342 | B2 * | 7/2020 | Raleigh | H04W 4/50 |
| 2008/0306759 | A1 * | 12/2008 | Ilkin | G06Q 10/10 705/2 |
| 2019/0034982 | A1 * | 1/2019 | Kulp | H04L 67/26 |

OTHER PUBLICATIONS

SendGrid [Online] Available at: https://sendgrid.com/ Accessed: May 13, 2020.
Sendwithus [Online] Available at: https://www.dyspatch.io/sendwithus/ Accessed: May 13, 2020.
SparkPost [Online] Available at: https://www.sparkpost.com/ Accessed: May 13, 2020.
MailJet [Online] Available at: https://www.mailjet.com/ Accessed: May 13, 2020.
MailChimp (+Mandrill) [Online] Available at: https://mailchimp.com/ Accessed: May 13, 2020.
Elastic-Email [Online] Available at: https://elasticemail.com/ Accessed: May 13, 2020.

(Continued)

*Primary Examiner* — Andy Ho
(74) *Attorney, Agent, or Firm* — McDermott Will & Emery LLP

(57) ABSTRACT

Various aspects of the subject technology relate to systems, methods, and machine-readable media for notifying users of marketplace events. The method includes creating a template of a plurality of templates that corresponds to a marketplace event of a plurality of marketplace events. The template may include a name, a description, and conditions for selection of the template. Each template may be utilized for generating a notification. The method also includes previewing the template during creation to ensure proper rendering of the template in the notification. The method also includes sending a test notification to ensure proper delivery and rendering of the notification. The method also includes specifying an audience for the template. The audience may include at least one user that will receive the notification generated from the template.

20 Claims, 13 Drawing Sheets

(56) References Cited

OTHER PUBLICATIONS

Mailgun [Online] Available at: https://www.mailgun.com/ Accessed: May 13, 2020.
Campaign Monitor [Online] Available at: https://www.campaignmonitor.com/ Accessed: May 13, 2020.
Pepipost [Online] Available at: https://pepipost.com/ Accessed: May 13, 2020.
ActiveTrail [Online] Available at: https://www.activetrail.com/ Accessed: May 13, 2020.
SendPulse [Online] Available at: https://sendpulse.com/ Accessed: May 13, 2020.
SendinBlue [Online] Available at: https://www.sendinblue.com/ Accessed: May 13, 2020.
SocketLabs [Online] Available at: https://www.socketlabs.com/ Accessed: May 13, 2020.
Sendloop [Online] Available at: https://sendloop.com/ Accessed: May 13, 2020.
Tipimail [Online] Available at: https://www.tipimail.com/ Accessed: May 13, 2020.
Doppler Relay [Online] Available at: https://www.dopplerrelay.com/ Accessed: May 13, 2020.
Amazon SES [Online] Available at: https://aws.amazon.com/ses/ Accessed: May 13, 2020.
Postage App [Online] Available at: https://postageapp.com/ Accessed: May 13, 2020.
MessageGears [Online] Available at: https://messagegears.com/ Accessed: May 13, 2020.
Postmark [Online] Available at: https://postmarkapp.com/ Accessed: May 13, 2020.
Dynamic DNS (DynDNS) [Online] Available at: https://dyn.com/ Accessed: May 13, 2020.
JangoMail [Online] Available at: https://jangomail.com/ Accessed: May 13, 2020.

* cited by examiner

| SETTINGS | Customer Notifications 202 | | 204 | 206 | 208 | |
|---|---|---|---|---|---|---|
| General Settings | Show Filters | | | | Product | 🔍 |
| Developers | Status | Notification Type | Category | Audience | Version | |
| Marketplace Functionality | | | | | | |
| Roles | ☑ | Product Load Created (Leads V2) | Assisted Sales Emails | Marketplace Manager | V1 | ● ▸ |
| Assisted Sales | ☑ | Product Load Created (Leads V2) | Assisted Sales Emails | App Developer | V1 | ● ▸ |
| Security | | | | | | |
| BILLING SETTINGS | ☑ | Product Load Created (Leads V2) | Assisted Sales Emails | Reseller Manager | V1 | ● ▸ |
| Billing Functionality | ☑ | Product Load Created (Leads V2) | Assisted Sales Emails | Reseller | V1 | ● ▸ |
| Payment Gateway | | | | | | |
| Invoice Settings | ☑ | Product Profile Lead Generated | Assisted Sales Emails | Marketplace Manager | V1 | ● ▸ |
| Invoice Templates | ☑◁ | New Invoice Created | Billing | Product Owner, Bilin... | V2 | ● ▸ |
| CUSTOM UI | | | | | | |
| FAQs | ☑ | Off-platform product purchased | Billing | Product Owner | V1 | ● ▸ |
| Customer Notifications | ☑◁ | Product Purchase Event | Billing | Product Owner, Sales... | V2 | ☐ ▸ |
| Custom Attributes | | | | | Edit | View Sent Notifications |
| Translations | ☑◁ | Product Purchased | Billing | Product Owner | Send Test Notification | |
| INTEGRATION | ☑◁ | Product Purchased by Sales Agent | Billing | Product Owner, Sa... | | |
| API Clients | | | | | | |
| Migration | ☑ | Product Purchased by User | Billing | Company Admin | V1 | ● ▸ |
| Webhooks | | | | | | |
| Microsoft | ☑ | Product Upgraded | Billing | Product Owner | V1 | ● ▸ |

Customer Notifications ▶ Product Purchase Event

Product Purchase Event

| SETTINGS | |
|---|---|
| General Settings | |
| Developers | |
| Marketplace Functionality | |
| Roles | |
| Assisted Sales | |
| Security | |
| BILLING SETTINGS | |
| Billing Functionality | |
| Payment Gateway | |
| Invoice Settings | |
| Invoice Templates | |
| CUSTOM UI | |
| FAQs | |
| Customer Notifications | |
| Custom Attributes | |
| Translations | |
| INTEGRATION | |
| API Clients | |
| Migration | |
| Webhooks | |
| Microsoft | |
| Google | |
| MOBILE MARKETPLACE | |

☑ Email ⇄ Off platform

○ Default ▼ —302

○ t1
○ DIRECT SALES     plate
✓ ○ Default
✤ New Template —304

You can not add a condition to the Default template. To use conditions, you can create a new template Status: ⊙ Enabled
Created On: 03/26/2019 —308
Last Modified: 03/26/2019

306

Email Options ▶

Audience

To: [Product Owner ✕]

CC:

BCC:

Email content

◆ Save and Preview

| SETTINGS | Customer Notifications > Product Purchase Event > Create New Template |
|---|---|
| General Settings | Create New Template |
| Developers | |
| Marketplace Functionality | * Template name                    * Description |
| Roles | [Golden edition / Microsoft purchases] — 312    [MS golden] — 314 |
| Assisted Sales | |
| Security | * Conditions — 316 |
| BILLING SETTINGS | Use this notification template when all conditions evaluate to True based on the contents of the notification being sent. if there are no conditions, or all conditions are disabled, the template is selected based on its assigned priority (lower number first) from the existing templates of this type. |
| Billing Functionality | |
| Payment Gateway | |
| Invoice Settings | |
| Invoice Templates | |
| CUSTOM UI | |
| FAQs | There are no conditions, Click Add condition to create a condition, You are required to add a condition before you can create a new template |
| Customer Notifications | ⊕ Add Condition |
| Custom Attributes | |
| Translations | |
| INTEGRATION | |
| API Clients | [Create Template]  Cancel |
| Migration | |
| Webhooks | |
| Microsoft | |
| Google | |
| MOBILE MARKETPLACE | |

Add Condition

○ Condition name
[Microsoft product] ─318

○ Parameter
[applicationName] ─320

○ Operator
[equals ▲▼] ─322

○ Value
[MICROSOFT] ─324

Hide condition validation «
[⊘ Validate Condition] ─326  Validation results: Unverified {
"partnerLabel": "AppDirect",
"partnerStoreLabel": "Flower",
"baseUrl": "https://appdirect.com",
"supportUrl": "http://support.appdirect.com",
"marketplaceLogoUrl": "https://appdirect.com/marketplace_logo/img745070518381467 2896.png?

[Save Conditions]  [Cancel]

[Help with Conditions]

FIG. 3C

| SETTINGS | Customer Notifications > Product Purchase Event > Create New Template |
|---|---|
| General Settings | Create New Template |
| Developers | |
| Marketplace Functionality | * Template name      * Description |
| Roles | [ Golden edition / Microsoft purchases ]—312    [ MS golden ]—314 |
| Assisted Sales | |
| Security | * Conditions—316                                           ⊕ Add Condition |
| BILLING SETTINGS | Condition name     Selector     Operator     Value |
| Billing Functionality | Microsoft product     applicationName     equals     MICROSOFT    ● ▾ |
| Payment Gateway | 328—◯⊃ Do not send notifications matching these conditions ◯ |
| Invoice Settings | [ Create Template ]   Cancel |
| Invoice Templates | |
| CUSTOM UI | |
| FAQs | |
| Customer Notifications | |
| Custom Attributes | |
| Translations | |
| INTEGRATION | |
| API Clients | |
| Migration | |
| Webhooks | |
| Microsoft | |
| Google | |
| MOBILE MARKETPLACE | |

| Invoice Templates | | | | |
|---|---|---|---|---|
| CUSTOM UI | Conditions | | | ⊕ Add Condition |
| FAQs | Condition name | Selector | Operator | Value |
| Customer Notifications | Microsoft product | applicationName | equals | MICROSOFT |
| Custom Attributes | Sales Rep Company ABC | salesRepCompanyName | equals | ABC |
| Translations | ⊘ Do not send notifications matching these conditions | | | |
| INTEGRATION | | | | |
| API Clients | Audience —330 | | | |
| Migration | To: | Product Owner ✕  You can only have one TO audience | | |
| Webhooks | | | | |
| Microsoft | CC: | | | |
| Google | | | | |
| MOBILE MARKETPLACE | BCC: | | | |
| Branding | | | | |
| DATA SYNC | The Subject and Content were copied from the default template. You can modify the template, then save your changes. ✕ | | | |
| Sync Settings | | | | ◆ Save and Preview |
| | Email content | | | |
| | Language: English (United States) ▾ | | | |
| | Subject: Async Event for {userFullName} | | | |
| | File ▸ Edit ▸ View ▸ Insert ▸ Format ▸ Tools ▸ Table ▸ Help ▸ | | | |
| | ⤺ ⤻ Formats ▸ B I ≡ ≡ ≡ ≡ ≔ ▸ ≔ ▸ 囲 ▸ 囲 ◆ ▣ ◇ | | | |

A product event has happened.

Hello,

A user has acted on their subscription of your product {applicationName} on {partnerStoreLabel}. Please find event details below.

| EVENT DETAILS | |
|---|---|
| Event Type: | {EVENT_TYPE} |

104 words

Simple Parameters {Drag and drop or click to add a parameter to this template} ⓘ

{applicationName} {baseUrl} {companyExtemailid} {companyName} {XDirectSales} {marketplaceLogoUrl} {partnerLabel} {partnerStoreLabel} {salesRepCompanyName} {salesRepEmail} {salesRepFirstName} ← 340
{salesRepLastName} {salesRepSalution} {salesRepTitle} {salutation} {supportEmail} {supportPhone}
{supportUrl} {userEmail} {userfirstName} {userfullName} {userLastName} {userTitle}

👁 View parameters example   👁 View parameters definition                    344

Save  — 342                                                          🗑 Delete Template

Send Test Email Notification: Product Purchase Event                                    ✖

Send email test notification to:
[ francois.duquette+notifications@appdirect.co ] *400

Notification Parameters for this test:

You can generate test email based on the current parameters included in this notification template or change the value of one or more parameters (for example, for the salutation parameter, change the value from Hello to Greetings).

```
"marketplaceLogoUrl": "https//appdirect.com/marketplace_logo/img74507051838814672896.png?9dbc3c209c9102a5e4c12cfa98fb7134
"suportPhone": "1-800-999-9999".
"supportEmail": "support@appdirect.com".
"salutation": Hello".
"userTitle": "MS".
"userFirstName": "Emma".
"userLastName": "Jackson".
```

[Send Test] Cancel                                                                     402

Send Test Notification: Scheduled subscription Cancellation Reminder                    ✖

Select one or both delivery methods (email, SMS) to test this notification type.

Send email test notification to:
[ francois.duquette+notifications@appdirect.co ] *400

Send SMS test notification to:
[ 415-555-555 ] *404

Notification Parameters for this test:

You can generate test email based on the current parameters included in this notification template or change the value of one or more parameters (for example, for the salutation parameter, change the value from hello to greetings).

```
'userEmail':'emma.jackson@fake.appdirect.com'
'companyName': 'Silicondexon'.
'companyExternalId': 'C125897'.
'applicationName': 'MICROSOFT'.
'applicationId': '414'.
'editionName': 'SILVER'.
'appLaunchUrl': "https://appdirect.com/Launch-app?applicationid-1210".
'OrderId': 7127
```

[Send Test] Cancel                                                                     402

Prioritize Templates                                                                                                                            ✕

Defines the order in which the templates are selected. To change the order in which a template is prioritized. click the list icon in the template's first column. then drag it up or down to the desired location. if no template applies to a condition the default template is used unless disabled or modified by conditions.
                                                                                                                                           504

| Reorder | Prority | Template | Decription | Status | Conditions | |
|---|---|---|---|---|---|---|
| ☐ | 1  502 | Golden_action_Microsoft_pu | MS golden | ○ Disabled | 2 | ⚙ ▾ |
| ☐ | 2 | t1 | d1 | ○ Enabled | 1 | ⚙ ▾ |
| ☐ | 3 | DIRECT_SALES | This is the direct-sales template | ○ Disabled | 1 | ⚙ ▾ |
| ☐ | 4 | Default | This is the default templates | ○ Enabled | 0 | ⚙ ▾ |

| Save | Cancel

FIG. 5

ADVANCED NOTIFICATION SYSTEM

TECHNICAL FIELD

The present disclosure generally relates to a notification system, and more particularly to an advanced notification system that allows customization of notification templates for generating directed notifications to users.

BACKGROUND

Online marketplaces typically notify users of important marketplace events through automated notifications. These automated notifications may be computer-generated based on generic templates that have limited customization features. As a result, the automated notifications that are sent to users may not be appropriate for all users, as different users may have different situations that may need to be addressed on an individual basis.

BRIEF SUMMARY

The subject disclosure addresses these shortcomings by providing for an advanced notification system that allows customization of notification templates for generating directed notifications to users. According to an aspect, an administrator creates various templates for a given marketplace event. For example, over hundreds of distinct marketplace events may be supported, and the administrator may be able to configure different notification templates that will be used for various communications sent to the users of the marketplace. The administrator may also preview the template during creation to make sure it renders properly according to expectations. This may also speed up the template design time and testing as well. For example, the administrator may send test notifications during creation to make sure the notification renders properly. The administrator may also configure an audience for each template. For example, for an email template type, email addresses or predefined platform roles may be converted at runtime into corresponding email addresses. Furthermore, the email addresses may be configured to populate at least one of the TO, CC, or BCC fields of an email. The administrator may also configure selection conditions for each template, which will inform the system of circumstances under which a certain template will be selected over another. According to aspects, the administrator may prioritize the various templates created, so that when a marketplace event gets triggered at runtime, the system knows in which order it evaluates each available template to determine if the existing template conditions are met. Hence, an appropriate template may be selected and sent to the configured audience(s). If no appropriate template is identified, the system may continue its evaluation of each template until an appropriate template is found.

According to one embodiment of the present disclosure, a computer-implemented method for notifying users of marketplace events is provided. The method includes creating a template of a plurality of templates that corresponds to a marketplace event of a plurality of marketplace events. The template may include a name, a description, and conditions for selection of the template. Each template may be utilized for generating a notification. The method also includes previewing the template during creation to ensure proper rendering of the template in the notification. The method also includes sending a test notification to ensure proper delivery and rendering of the notification. The method also includes specifying an audience for the template. The audience may include at least one user that will receive the notification generated from the template.

According to one embodiment of the present disclosure, a system is provided including a processor and a memory comprising instructions stored thereon, which when executed by the processor, causes the processor to perform a method for notifying users of marketplace events. The method includes creating a template of a plurality of templates that corresponds to a marketplace event of a plurality of marketplace events. The template may include a name, a description, and conditions for selection of the template. Each template may be utilized for generating a notification. The method also includes previewing the template during creation to ensure proper rendering of the template in the notification. The method also includes sending a test notification to ensure proper delivery and rendering of the notification. The method also includes specifying an audience for the template. The audience may include at least one user that will receive the notification generated from the template.

According to one embodiment of the present disclosure, a non-transitory computer-readable storage medium is provided including instructions (e.g., stored sequences of instructions) that, when executed by a processor, cause the processor to perform a method for notifying users of marketplace events. The method includes creating a template of a plurality of templates that corresponds to a marketplace event of a plurality of marketplace events. The template may include a name, a description, and conditions for selection of the template. Each template may be utilized for generating a notification. The method also includes previewing the template during creation to ensure proper rendering of the template in the notification. The method also includes sending a test notification to ensure proper delivery and rendering of the notification. The method also includes specifying an audience for the template. The audience may include at least one user that will receive the notification generated from the template.

According to one embodiment of the present disclosure, a system is provided that includes means for storing instructions, and means for executing the stored instructions that, when executed by the means, cause the means to perform a method for notifying users of marketplace events. The method includes creating a template of a plurality of templates that corresponds to a marketplace event of a plurality of marketplace events. The template may include a name, a description, and conditions for selection of the template. Each template may be utilized for generating a notification. The method also includes previewing the template during creation to ensure proper rendering of the template in the notification. The method also includes sending a test notification to ensure proper delivery and rendering of the notification. The method also includes specifying an audience for the template. The audience may include at least one user that will receive the notification generated from the template.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 shows a list of exemplary notification types, according to certain aspects of the disclosure.

FIGS. 3A-3G illustrate exemplary administrator graphical user interfaces (GUIs) for setting up templates for notifications, according to certain aspects of the disclosure.

FIGS. 4A and 4B illustrate exemplary administrator GUIs for sending test notifications, according to certain aspects of the disclosure.

FIG. 5 illustrates an exemplary administrator GUI for prioritizing templates, according to certain aspects of the disclosure.

Figure 1:
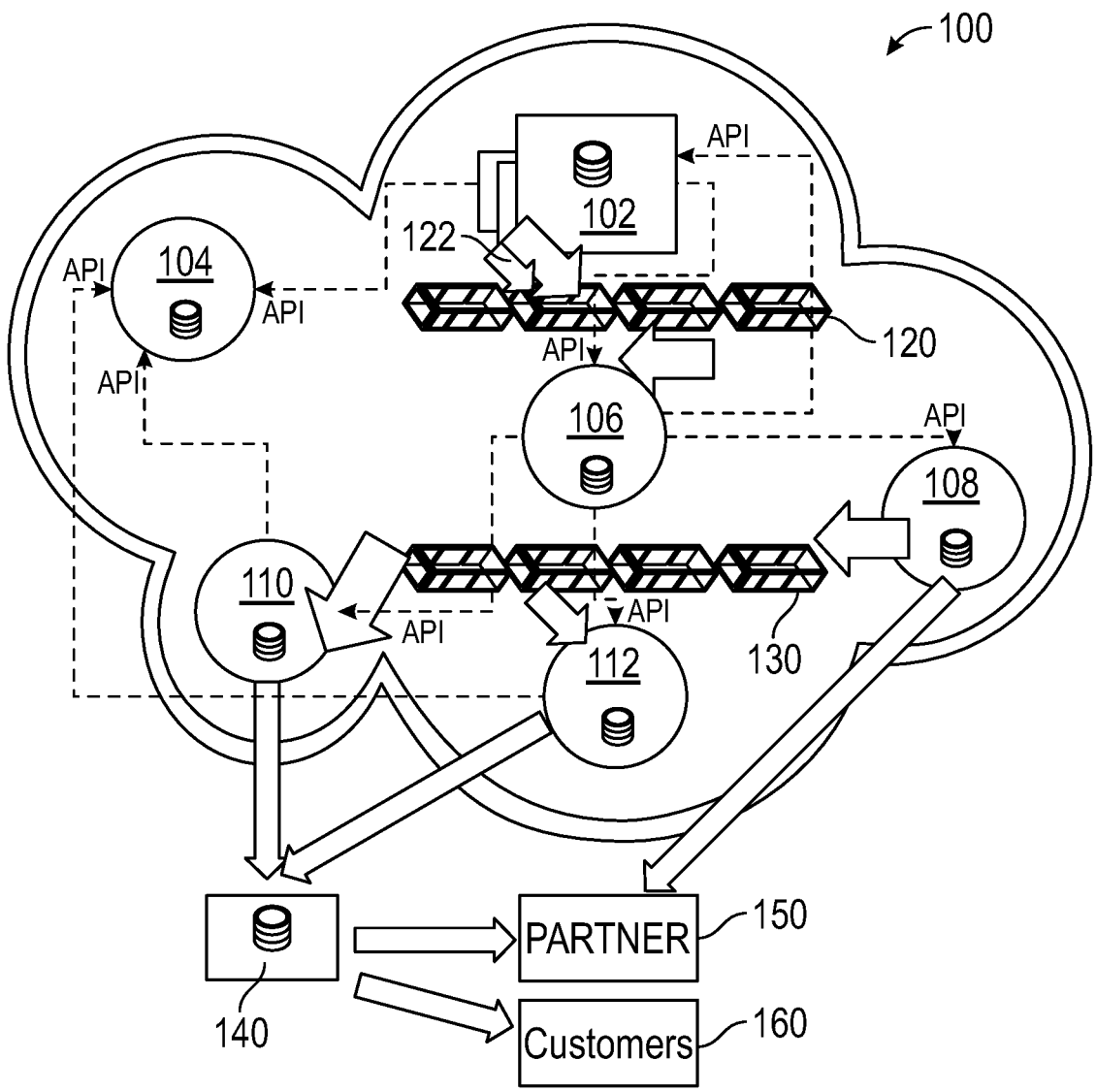
FIG. 1 illustrates an example advanced notification system for notifying users of marketplace events, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Online marketplaces typically notify users of important marketplace events through automated notifications. These automated notifications may be computer-generated based on generic templates that have limited customization features. As a result, the automated notifications that are sent to users may not be appropriate for all users, as different users may have different situations that may need to be addressed on an individual basis.

Aspects of the present disclosure address these issues by providing for an advanced notification system that allows customization of notification templates for generating directed notifications to users. According to an aspect, an administrator creates various templates for a given marketplace event. For example, over hundreds of distinct marketplace events may be supported, and the administrator may be able to configure different notification templates that will be used for various communications sent to the users of the marketplace. The administrator may also preview the template during creation to make sure it renders properly according to expectations. This may also speed up the template design time and testing as well. For example, the administrator may send test notifications during creation to make sure the notification renders properly. The administrator may also configure an audience for each template. For example, for an email template type, email addresses or predefined platform roles may be converted at runtime into corresponding email addresses. Furthermore, the email addresses may be configured to populate at least one of the TO, CC, or BCC fields of an email. The administrator may also configure selection conditions for each template, which will inform the system of circumstances under which a certain template will be selected over another. According to aspects, the administrator may prioritize the various templates created, so that when a marketplace event gets triggered at runtime, the system knows in which order it evaluates each available template to determine if the existing template conditions are met. Hence, an appropriate template may be selected and sent to the configured audience(s). If no appropriate template is identified, the system may continue its evaluation of each template until an appropriate template is found.

According to aspects, the notification system may be cloud-based and multi-tenant. For example, a notification system application may include multiple services (e.g., micro services) hosted in the cloud. The notification system application may also be configured to handle multiple different customers in one single instance/deployment of the application (e.g., multi-tenant). Everything may be handled through a database, so that when an administrator configures the different notification types and templates etc. (as described herein), there may also be a contextual customer/partner set in the background. In this way, all operations made by the administrator on through a notification user interface may record entries in the database for that contextual customer/partner (e.g., customer A). If an administrator accesses the notification user interface of another marketplace of another customer (e.g., customer B), then all changes made while using the notification system application may be recorded under that other customer (e.g., customer B), or tenant. Advantages of having a cloud-based, multi-tenant configuration includes the ability to support multiple customers in one single instance/installation. Therefore, there is no need to install or deploy the notifications application for each customer who wants to use it.

The disclosed system addresses a problem in traditional notification systems tied to computer technology, namely, the technical problem of automating generation of individualized notifications to users. The disclosed system solves this technical problem by providing a solution also rooted in computer technology, namely, by providing for an advanced notification system that allows customization of notification templates for generating directed notifications to users. The disclosed subject technology further provides improvements to the functioning of the computer itself because it increases efficiency in generating directed notifications to users.

FIG. 1 illustrates an example advanced notification system 100 for notifying users of marketplace events, according to certain aspects of the disclosure. The advanced notification system 100 may include multiple micro services 102, 104, 106, 108, 110, and 112. For example, the advanced notification system 100 may include a marketplace platform 102 (i.e., that also includes marketplace micro services), a templates manager 104, a notification manager 106, a software hook notifier 108, an email notifier 110, and a short message service (SMS) notifier 112. For example, each of the micro services 102, 104, 106, 108, 110, and 112 may communicate with each other via application programming interfaces (APIs).

According to aspects, the marketplace platform 102 may initiate sending of a notification by pushing a notification 122 based on an event to a first queue 120. The first queue 120 may be a messaging queue that includes notifications accumulated in order of occurrence. In this way, thousands of notifications may be accumulated in the first queue 120 to scale generation of the notifications to thousands of users. The notification manager 106 may monitor and read each notification 122 in the first queue 120 and perform data transformations to the notifications 122 based on specified parameters in each notification 122. After the notification manager 106 captures all additional data in the notification 122, the notification manager 106 pushes the notification 122 to a second queue 130. For example, the notifications pushed to the second queue 130 may include additional data populated by the notification manager 106.

Once in the second queue 130, the notifications wait to be sent out by one of the software hook notifier 108, the email notifier 110, or the SMS notifier 112, depending on a medium of notification. For example, if the notification 122 is to be sent via email, the email notifier 110 will handle sending of the notification 122. If the notification 122 is to be sent via SMS, then the SMS notifier 112 will handle. If the notification 122 is to be sent through a web hook service, then the software hook notifier 108 will handle. For example, whenever there is a notification that is published to the second queue 130, all three of the software hook notifier 108, the email notifier 110, and the SMS notifier 112 will read the same notification and determine which medium(s) to deliver the notification. In an implementation, each notification may include a designation as to which medium(s) will deliver the notification. According to aspects, each notification may be sent over one or multiple mediums of communication.

According to aspects, the templates manager 104 may be configured to store notification templates. For example, the templates may be created by an administrator based on a variety of factors, as described below. In an implementation, the templates allow for customization of notifications for a variety of users based on an occurrence of events. For example, the email notifier 110 and the SMS notifier 112 may each access the templates manager 104 to retrieve an appropriate template to generate an email or SMS to be sent. The templates manager 104 is also responsible for rendering the notification to be sent based on data received from the email notifier 110 and/or the SMS notifier 112. The templates manager 104 renders the notification and then returns the rendered notification to the appropriate micro service for sending to a partner 150 or customers 160. For example, the micro services may first send the rendered notification to a third party notifier system 140, which then delivers the notification to the appropriate recipient(s). Because the software hook notifier 108 is server-to-server based, there is no rendering to be done, and so a hook notifier itself would be sent out directly to the partner 150 or customers 160.

FIG. 2 shows a list of exemplary notification types 200, according to certain aspects of the disclosure. For example, the notification types 200 may correspond to a variety of events that may occur in a marketplace, such as product lead created, new invoice created, off-platform product purchased, product purchase event, product upgraded, etc. It is understood that these notifications are exemplary only, and other notifications may be included without departing from the scope of the disclosure. According to aspects, an administrator may manually setup multiple templates for each notification type, as will be described in further detail below in FIGS. 3A-3G.

In an implementation, an administrator may access the notifications 200 through a user interface. Each of the notifications 200 may correspond to a type 202, a category 204, an audience 206, and a version 208. Options 210 for editing, viewing sent notifications, and sending test notifications may also be included. The category 204 may include details such as "Assisted Sales Emails" and "Billing." The audience 206 may include a description of the intended audience for each notification type 200. The version 208 may indicate a version of each notification type 200. It is understood that the illustrated categories, audiences, and versions are exemplary only, and additional categories, audiences, and versions may also be included without departing from the scope of the disclosure.

Figure 3F:
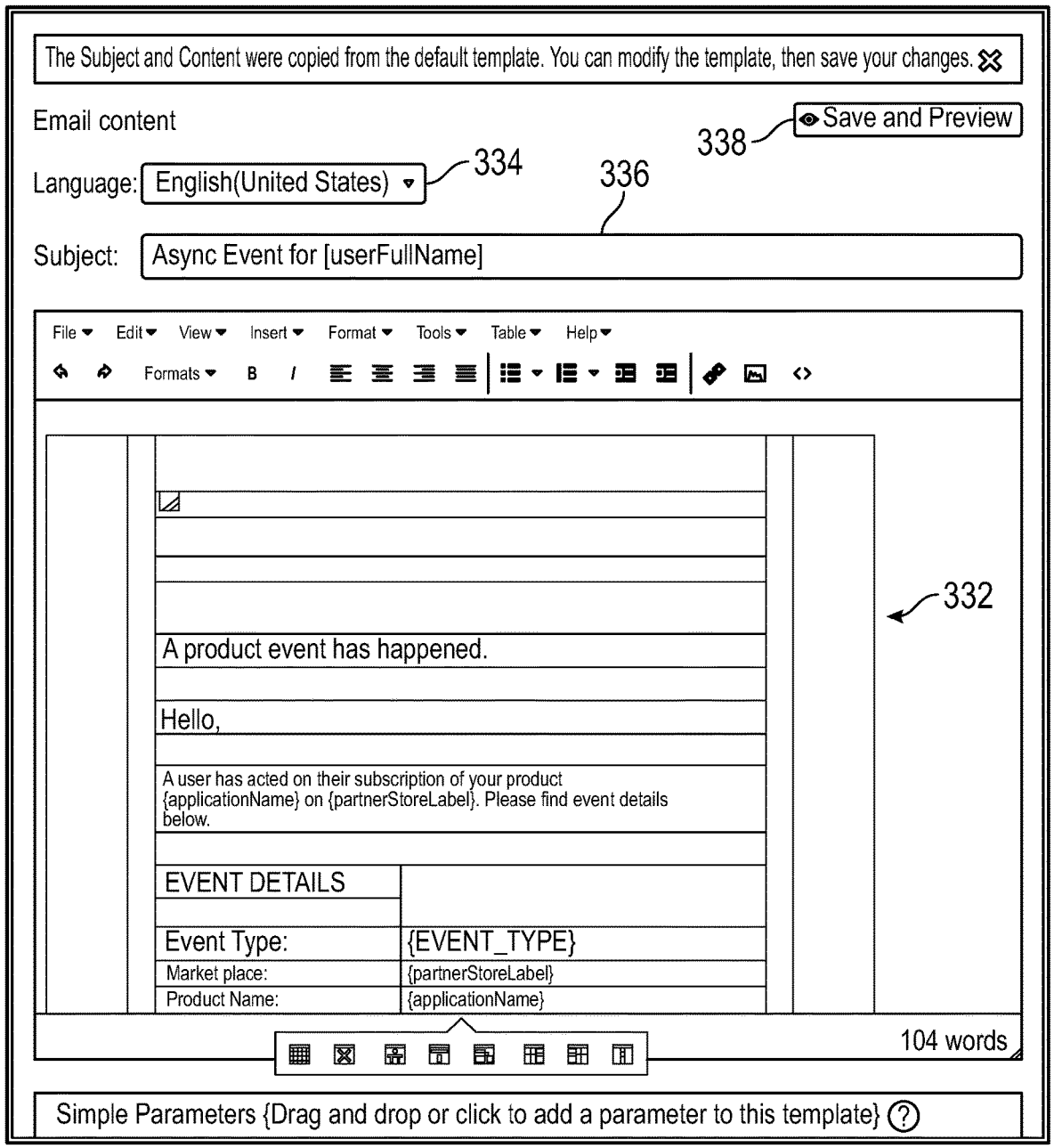

FIGS. 3A-3G illustrate exemplary administrator graphical user interfaces (GUIs) for setting up templates for notifications, according to certain aspects of the disclosure. Referring to FIG. 3A, an administrator may select creation of a new template 304 through a drop-down menu 302 of a GUI 300. The drop-down menu 302 may also be utilized to select a previously saved template for editing. As illustrated in FIG. 3A, the administrator has selected for creation of the new template 304 for a product purchase event. Previous templates labelled "t1," "Default," and "DIRECT SALES" may also be included. It is understood that these labels are exemplary only, and other labels may be included without departing from the scope of the disclosure.

According to aspects, the administrator may also have the option to enable or disable a template through a status indicator 306. For example, as illustrated, "t1" and "Default" may be enabled, and "DIRECT SALES" may be disabled. Information 308 regarding creation date and last modification date may also be included.

FIG. 3B illustrates a GUI for creating a new template 310. Upon selecting for creation of a new template 304, the administrator provides a template name 312, a description 314, and conditions 316. The template name 312 may be a name to identify the specific template, the description 314 may include additional information (e.g., such as a product edition, etc.), and the conditions 316 may include conditions for selection of the template.

FIG. 3C illustrates adding of a condition 316 by the administrator. For example, the administrator may provide a condition name 318, a parameter 320, an operator 322, and a value 324. According to aspects, the condition may be validated 326 to ensure it works. The condition name 318 may be a name to identify the condition being specified, the parameter 320 may be selected from one of several predetermined parameters, the operator 322 may be a Boolean operator, and the value 324 may be a specific value to be compared to the parameter 320 through the operator 322. As illustrated, the administrator has selected that the condition 318 labeled "Microsoft product" will be satisfied if the parameter name "applicationName" is equal to "MICROSOFT."

Once the condition 316 is created, it may be added to the template 312, as shown in FIG. 3D. Once added, the condition 316 may be readily viewed and edited by the administrator. In an implementation, the administrator may choose to not send notifications that match the listed conditions 328.

Referring to FIG. 3E, after the conditions 316 are created, an audience 330 may be selected. For example, the audience 330 may be selected based on which delivery field (e.g., TO, CC, or BCC) it will be sent. The audience 330 may be selected based on predetermined labels, such as "Product Owner." In this case, the notification would be sent to the product owner.

Referring to FIG. 3F, the administrator may now edit content 332 of the notification. For example, the content 332 may include parameters to be auto-filled later on when sending the notification. The administrator may also designate a language 334 and a subject 336 for the notification. The subject 336 may also include parameters to be auto-filled later on when sending the notification. The administrator may also save and preview 338 the content 332 to ensure proper rendering of the notification when sending.

FIG. 3G illustrates a selection of parameters 340 that may be dragged and dropped into the template. It is understood that the parameters 340 are exemplary only, and other parameters may be included without departing from the scope of the disclosure. Upon finalizing the template, the administrator may choose to save 342 or delete 344 the template. It is understood that multiple templates may be created for each notification type 200.

FIGS. 4A and 4B illustrate exemplary administrator GUIs 410 and 420 for sending test notifications, according to certain aspects of the disclosure. Referring to FIG. 4A, an email test notification may be sent to a user 400 that satisfies specified parameters 402. As illustrated, the parameters 402 may be edited directly in a dialogue box to allow for adjustments and customizations to the notifications. According to aspects, each template may be configured to be sent over at least one of email, SMS, or software hook. For example, the template selected in FIG. 4A only allows for email notifications. As shown in FIG. 4B, test notifications may be sent to SMS 404 as well for that selected template.

FIG. 5 illustrates an exemplary administrator GUI 500 for prioritizing templates, according to certain aspects of the disclosure. For example, each template may be given a priority 502 to define an order in which the templates are selected. If the template includes conditions 504, then the conditions must be met as well. In this way, templates may be given higher priority over one another so that only the most relevant templates are selected and rendered as notifications to users.

According to aspects, the notification system may be cloud-based and multi-tenant. For example, a notification system application may include multiple services (e.g., micro services) hosted in the cloud. The notification system application may also be configured to handle multiple different customers in one single instance/deployment of the application (e.g., multi-tenant). Everything may be handled through a database, so that when an administrator configures the different notification types and templates etc., there may also be a contextual customer/partner set in the background. In this way, all operations made by the administrator on through a notification user interface may record entries in the database for that contextual customer/partner (e.g., customer A). If an administrator accesses the notification user interface of another marketplace of another customer (e.g., customer B), then all changes made while using the notification system application may be recorded under that other customer (e.g., customer B), or tenant. Advantages of having a cloud-based, multi-tenant configuration includes the ability to support multiple customers in one single instance/installation. Therefore, there is no need to install or deploy the notifications application for each customer who wants to use it.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
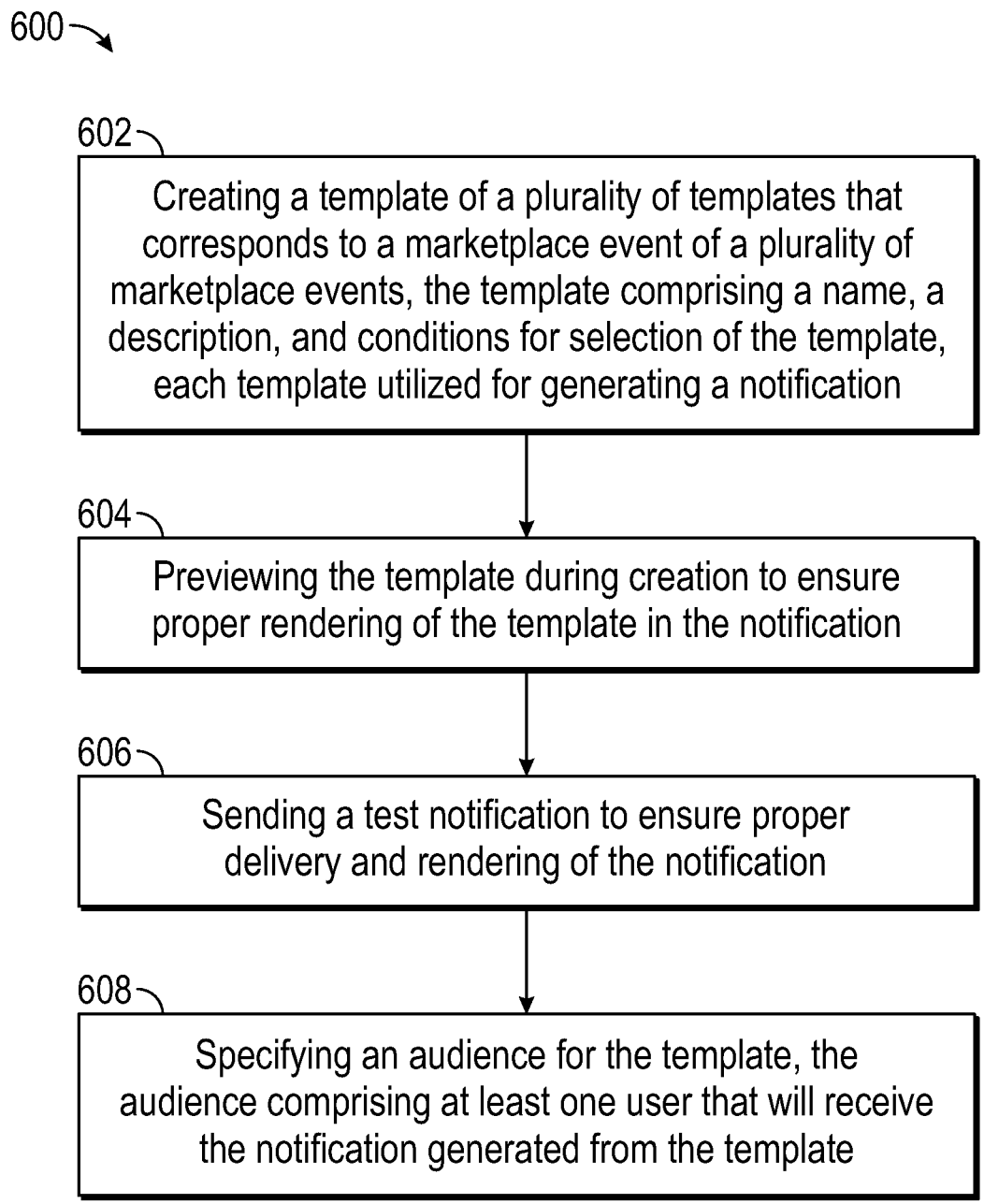
FIG. 6 illustrates an example flowchart for notifying users of marketplace events.

FIG. 6 illustrates an example flowchart (e.g., process 600) for notifying users of marketplace events (e.g., events). For explanatory purposes, the example process 600 is described herein with reference to FIGS. 1-5. Further for explanatory purposes, the steps of the example process 600 are described herein as occurring in serial, or linearly. However, multiple instances of the example process 600 may occur in parallel. For purposes of explanation of the subject technology, the process 600 will be discussed in reference to FIGS. 1-5.

At step 602, the process 600 includes creating one template of a plurality of templates that corresponds to one marketplace event (e.g., event) of a plurality of marketplace events. The template may include a name, a description, and conditions for selection of the template. Each template may be utilized for generating a notification. At step 604, the process 600 includes previewing the template during creation to ensure proper rendering of the template in the notification. At step 606, the process 600 includes sending a test notification to ensure proper delivery and rendering of the notification. At step 608, the process 600 includes specifying an audience for the template. The audience may include at least one user that will receive the notification generated from the template.

For example, as described above in relation to FIGS. 1-5, at step 602, a template 304 may be created through an administrator GUI 310 that corresponds to a marketplace event 202. The template 304 may include a name 312, a description 314, and conditions 316 for selection of the template. Each template 304 may be utilized for generating a notification to send to an end user 150 and 160. At step 604, the template 304 may be previewed during creation to ensure proper rendering of the template 304 in the notification. At step 606, a test notification 410 and 420 may be sent to ensure proper delivery and rendering of the notification. At step 608, an audience 330 may be specified for the template 304. The audience 330 may include at least one user that will receive the notification generated from the template 304.

According to an aspect, the audience includes contact information for each user. According to an aspect, the notification is sent through email, short message service (SMS), or push notification. According to an aspect, previewing the template further includes generating a preview that displays the notification that is rendered based on the template, and correcting the template based on errors in the preview.

According to an aspect, the process 600 further includes prioritizing each template of the plurality of templates based on a relevancy of each template to the audience. According to an aspect, the process 600 further includes enabling generation of the notification through an administrator interface, and generating the notification upon toggling of the marketplace event. According to an aspect, the process 600 further includes triggering the marketplace event to validate that the notification will be sent based on the template.

According to aspects, the notification system (e.g., advanced notification system 100) may be cloud-based and multi-tenant. For example, a notification system application (e.g., as shown in FIGS. 2-5) may include multiple services (e.g., micro services) hosted in the cloud. The notification system application may also be configured to handle multiple different customers in one single instance/deployment of the application (e.g., multi-tenant). Everything may be handled through a database, so that when an administrator (e.g., through administrator GUI 310) configures the different notification types and templates etc., there may also be a contextual customer/partner set in the background. In this way, all operations made by the administrator on through a notification user interface (e.g., as shown in FIGS. 2-5) may record entries in the database for that contextual customer/partner (e.g., customer A). If an administrator accesses the notification user interface of another marketplace of another customer (e.g., customer B), then all changes made while using the notification system application may be recorded under that other customer (e.g., customer B), or tenant. Advantages of having a cloud-based, multi-tenant configuration includes the ability to support multiple customers in one single instance/installation. Therefore, there is no need to install or deploy the notifications application for each customer who wants to use the notifications application.

Figure 7:
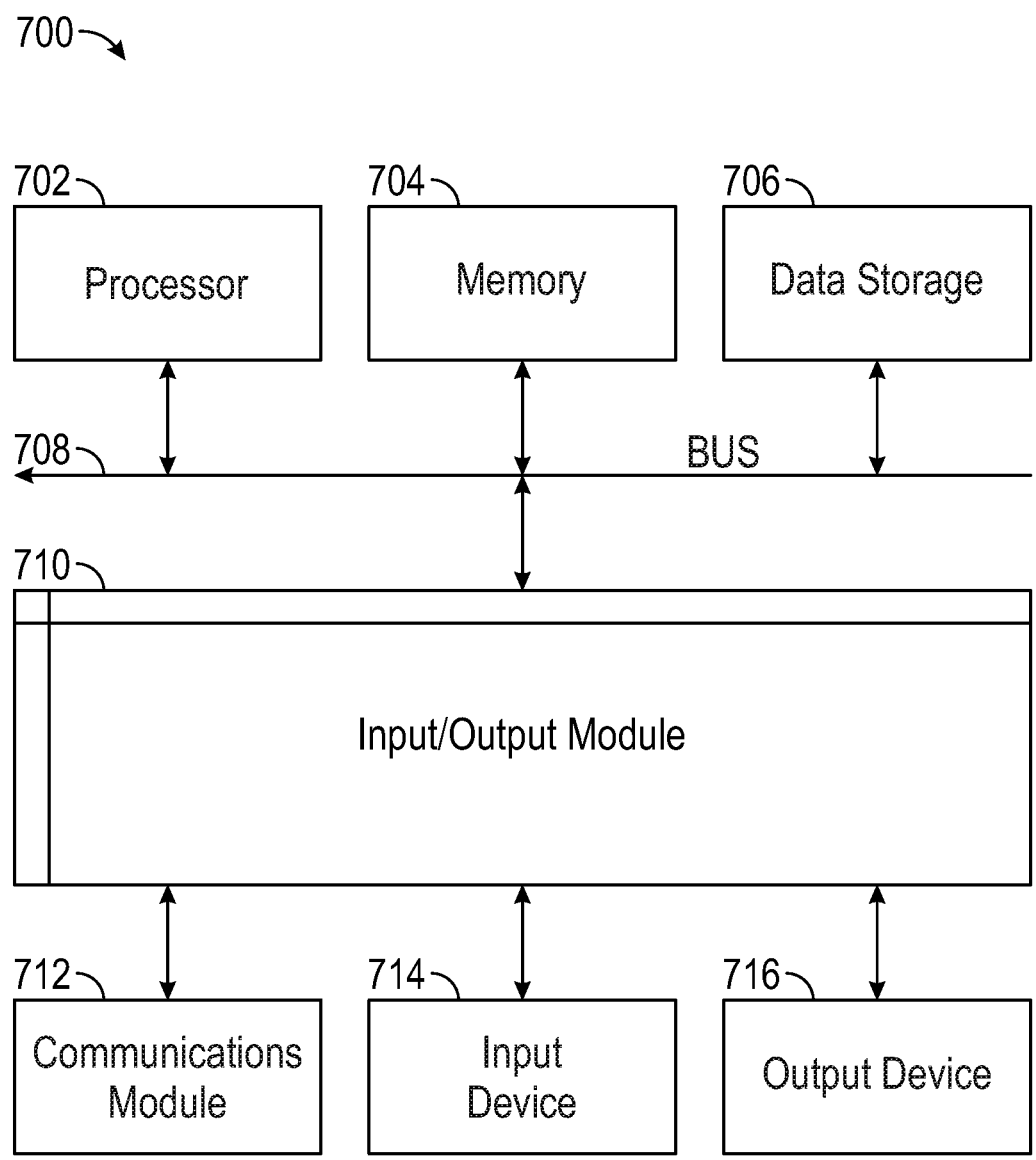
FIG. 7 is a block diagram illustrating an example computer system with which aspects of the subject technology can be implemented.

FIG. 7 is a block diagram illustrating an example computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 (e.g., server and/or client) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described systems can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the computing system 700 reads data, information may be read from the data and stored in a memory device, such as the memory 704. Additionally, data from the memory 704 servers accessed via a network or the bus 708, or the data storage 706 may be read and loaded into the memory 704. Although data is described as being found in the memory 704, it will be understood that data does not have to be stored in the memory 704 and may be stored in another memory accessible to the processor 702 or distributed among several media, such as the data storage 706.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for notifying users of events, comprising:
    creating a template of a plurality of templates that corresponds to an event of a plurality of events, the template comprising a name, a description, and conditions for selection of the template, each template utilized for generating a notification;
    previewing the template during creation of the template to ensure proper rendering of the template in the notification;
    generating a test notification that satisfies parameters specified through a user interface, each of the parameters selected from one of several predetermined parameters;
    in response to generating the test notification, sending the test notification to users to ensure proper delivery and rendering of the notification;
    specifying an audience for the template, the audience comprising a description of at least one user that will receive the notification generated from the template; and
    initiating, through a marketplace platform comprising a plurality of micro services, sending of the notification, the initiating comprising pushing the notification of the event to at least a first queue, the first queue comprising a messaging queue comprising notifications accumulated in an order of occurrence.

2. The computer-implemented method of claim 1, further comprising:
    prioritizing each template of the plurality of templates based on a relevancy of each template to the audience.

3. The computer-implemented method of claim 1, further comprising:
    enabling generation of the notification through an administrator interface; and
    generating the notification upon toggling of the event.

4. The computer-implemented method of claim 1, further comprising:
    triggering the event to validate that the notification will be sent based on the template.

5. The computer-implemented method of claim 1, wherein the audience comprises contact information for each of a plurality of users.

6. The computer-implemented method of claim 1, wherein the notification is sent through email, short message service (SMS), or push notification.

7. The computer-implemented method of claim 1, wherein previewing the template further comprises:
    generating a preview that displays the notification that is rendered based on the template; and
    correcting the template based on errors in the preview.

8. A system for notifying users of events, comprising:
    a processor; and
    a memory comprising instructions stored thereon, which when executed by the processor, causes the processor to perform:
        creating a template of a plurality of templates that corresponds to an event of a plurality of events, the template comprising a name, a description, and conditions for selection of the template, each template utilized for generating a notification;
        previewing the template during creation of the template to ensure proper rendering of the template in the notification;
        generating a test notification that satisfies parameters specified through a user interface, each of the parameters selected from one of several predetermined parameters;
        in response to generating the test notification, sending the test notification to users to ensure proper delivery and rendering of the notification;
        specifying an audience for the template, the audience comprising a description of at least one user that will receive the notification generated from the template; and
        initiating, through a marketplace platform comprising a plurality of micro services, sending of the notification, the initiating comprising pushing the notification of the event to at least a first queue, the first queue comprising a messaging queue comprising notifications accumulated in an order of occurrence.

9. The system of claim 8, further comprising stored sequences of instructions, which when executed by the processor, cause the processor to perform:
    prioritizing each template of the plurality of templates based on a relevancy of each template to the audience.

10. The system of claim 8, further comprising stored sequences of instructions, which when executed by the processor, cause the processor to perform:
    enabling generation of the notification through an administrator interface; and
    generating the notification upon toggling of the event.

11. The system of claim 8, further comprising stored sequences of instructions, which when executed by the processor, cause the processor to perform:
    triggering the event to validate that the notification will be sent based on the template.

12. The system of claim 8, wherein the audience comprises contact information for each of a plurality of users.

13. The system of claim 8, wherein the notification is sent through email, short message service (SMS), or push notification.

14. The system of claim 8, wherein previewing the template further comprises:
    generating a preview that displays the notification that is rendered based on the template; and
    correcting the template based on errors in the preview.

15. A non-transitory computer-readable storage medium is provided including instructions that, when executed by a processor, causes the processor to perform a method for notifying users of events, comprising:
    creating a template of a plurality of templates that corresponds to an event of a plurality of events, the template comprising a name, a description, and conditions for selection of the template, each template utilized for generating a notification;
    previewing the template during creation of the template to ensure proper rendering of the template in the notification;
    generating a test notification that satisfies parameters specified through a user interface, each of the parameters selected from one of several predetermined parameters;
    in response to generating the test notification, sending the test notification to users to ensure proper delivery and rendering of the notification;
    specifying an audience for the template, the audience comprising a description of at least one user that will receive the notification generated from the template; and initiating, through a marketplace platform comprising a plurality of micro services, sending of the notification, the initiating comprising pushing the notification of the event to at least a first queue, the first queue comprising a messaging queue comprising notifications accumulated in an order of occurrence.

16. The non-transitory computer-readable storage medium of claim 15, wherein the method further comprises: prioritizing each template of the plurality of templates based on a relevancy of each template to the audience.

17. The non-transitory computer-readable storage medium of claim 15, wherein the method further comprises:
enabling generation of the notification through an administrator interface; and
generating the notification upon toggling of the event.

18. The non-transitory computer-readable storage medium of claim 15, wherein the method further comprises:
triggering the event to validate that the notification will be sent based on the template.

19. The non-transitory computer-readable storage medium of claim 15, wherein the method further comprises receiving contact information for each of a plurality of users.

20. The non-transitory computer-readable storage medium of claim 15, wherein the method further comprises:
generating a preview that displays the notification that is rendered based on the template; and
correcting the template based on errors in the preview.

\* \* \* \* \*